UNITED STATES PATENT OFFICE.

LOUIS PAUL ANGENARD, OF NEW YORK, N. Y.

IMPROVED METHOD OF COATING GLASS WITH PLATINUM.

Specification forming part of Letters Patent No. 46,767, dated March 14, 1865.

*To all whom it may concern:*

Be it known that I, LOUIS PAUL ANGENARD, of the city, county, and State of New York, have invented certain new and useful Improvements in Coating Glass and other Articles with a Solution of Platina, for the purpose of making mirrors, looking-glasses, and other articles of use and ornament; and I do hereby declare the following to be a full description of the same.

The object of my improvements is to carry out more fully and in detail the invention described by me in my patent of January 31st, 1865, for coating the surfaces of glass with a solution of platina as a substitute for quicksilver in making mirrors and looking-glass. and other articles; and the nature of my improvements consists in the new method I adopt of preparing the solution of platina with the oil of the flowers of lavender, asphaltum, and spirits of ether or other volatile resinous oils or spirits of similar properties, and applying the same to the surface of the glass as a platinized varnish, or coating thereof, and subjecting the same to heat to cause the platina to unite with the surface of the glass, and thereby form mirrors, or looking-glass, or other articles of use and ornament.

To describe my improvements more particularly, I will proceed to set forth in detail the method I adopt to make the mirrors by the use of a given quantity of the solution of platina, presuming, as a matter of course, that it will be understood that the quantity will be increased or diminished according to the quantity of glass to be coated, and also will be varied in their proportions as circumstances may require to compensate for any difference in the quality of the articles used in producing the result aimed at.

I first take two-thirds of an ounce of pure platina and dissolve it in nitromuriatic acid mixed in the proportions of two and one-half ounces of muriatic acid to one and one-sixth ounce of nitric acid when those acids are pure, and if not, then in any other proportions that will thoroughly dissolve the platina. When the platina is thus dissolved I evaporate the acids, so as to obtain a salts of platina. This I grind upon a palette or in any other way into an impalpable powder. It is then divided into two equal parts, which I designate as "No. 1" and "No. 2." The first part, or No. 1, is then dissolved in about five ounces of the oil of the flowers of lavender, after which a small quantity of asphaltum is added to the solution—say one-fourth of an ounce, more or less, according to the quality of the oil of the flowers of lavender used and the body it is desired to give to the solution. When thus prepared it is spread with a suitable brush evenly and quickly over the surface of the glass, and then allowed to dry. It is then placed in a suitable oven and heat applied until it exhibits a dark-red color, when the fire is withdrawn and the article allowed to cool before coming in contact with the cold atmosphere. It is then removed from the oven and ready for the second preparation, or No. 2, which is made as follows: I take the second half of the salts of platina and dissolve it in spirits of ether, and then evaporate it to dryness. It is then redissolved in about three ounces of the oil of the flowers of lavender. When thus prepared it is applied over the previously-coated surface, as before described, and then placed in the oven again and reheated until it assumes a dark-red color. The fire is now withdrawn and the glass or other article operated upon allowed to cool, as before mentioned, when the operation is completed, and the glass may be removed from the oven with perfect safety, as the platina has been firmly united to its surface.

Although I have specially mentioned the oil of the flowers of lavender for making the platina varnish or solution, yet I have found that turpentine and other volatile resinous oils will make a varnish for like purposes described by me, but do not think their use at all equal in effect to the use of the oil of the flowers of lavender; but as this may be a question of taste or judgment, which subsequent experience can only determine, (as my improvements as yet may, perhaps, be said to be only experimental results,) I desire it to be understood that I do not dedicate to the public the use of either turpentine or other volatile resinous oils as a substitute, in whole or part, for the use of the oil of the flowers of lavender in my process hereinbefore described for coating the surface of glass with a solution of platina as a substitute for quicksilver in making mirrors, &c.

Having now described my improvements, I will proceed to set forth what I claim and desire to secure by Letters Patent of the United States—

The improved method or process of preparing and applying a solution of platina, as hereinbefore substantially described, as a coating for the surface of glass or other articles for making mirrors and articles of use and ornament, as an improvement on my patent of the 31st January, 1865, for a like purpose.

LOUIS PAUL ANGENARD.

Witnesses:
CHARLES L. BARRETT,
TIMOTHY BALDWIN, Jr.